(12) United States Patent
Chari et al.

(10) Patent No.: US 10,540,490 B2
(45) Date of Patent: Jan. 21, 2020

(54) DEEP LEARNING FOR TARGETED PASSWORD GENERATION WITH COGNITIVE USER INFORMATION UNDERSTANDING

(71) Applicant: International Business Machines Corporation, Armonk, NY (US)

(72) Inventors: Suresh N. Chari, Scarsdale, NY (US); Benjamin J. Edwards, Ossining, NY (US); Taesung Lee, Ridgefield, CT (US); Ian M. Molloy, Chappaqua, NY (US); Youngja Park, Princeton, NJ (US)

(73) Assignee: International Business Machines Corporation, Armonk, NY (US)

(*) Notice: Subject to any disclaimer, the term of this patent is extended or adjusted under 35 U.S.C. 154(b) by 41 days.

(21) Appl. No.: 15/793,408

(22) Filed: Oct. 25, 2017

(65) Prior Publication Data
US 2019/0121953 A1    Apr. 25, 2019

(51) Int. Cl.
*G06F 21/35* (2013.01)
*H04L 29/06* (2006.01)
*G06F 21/34* (2013.01)

(52) U.S. Cl.
CPC ............ *G06F 21/35* (2013.01); *G06F 21/34* (2013.01); *H04L 63/083* (2013.01); *H04L 63/0815* (2013.01); *G06F 2221/2117* (2013.01); *G06F 2221/2119* (2013.01); *H04L 63/0853* (2013.01)

(58) Field of Classification Search
CPC .. G06F 21/35; G06F 21/34; G06F 2221/2119; G06F 2221/2117; G06F 21/46; G06F 21/2221; G06F 21/2117; G06F 21/2119; H04L 63/0815; H04L 63/083; H04L 63/0853
See application file for complete search history.

(56) References Cited

U.S. PATENT DOCUMENTS

| | | | |
|---|---|---|---|
| 6,151,593 A * | 11/2000 | Cho | G06F 21/32 706/16 |
| 8,942,431 B2 * | 1/2015 | Forero | G06K 9/00335 382/115 |
| 2006/0242424 A1 * | 10/2006 | Kitchens | G06F 21/316 713/183 |
| 2007/0150943 A1 | 6/2007 | Guo et al. | |

(Continued)

OTHER PUBLICATIONS

De Carne De Carnavalet, "A Large-Scale Evaluation of High-Impact Password Strength Meters," A thesis in The Department of Concordia Institute for Information Systems Engineering, Concordia University, Montreal, Quebec, Canada, Apr. 2014, 128 pages.

(Continued)

*Primary Examiner* — Benjamin R Bruckart
*Assistant Examiner* — Aklil M Tesfaye
(74) *Attorney, Agent, or Firm* — VanLeeuwen & VanLeeuwen; Jeffrey S. LaBaw

(57) ABSTRACT

An approach is provided that receives a set of user information pertaining to a user. The received set of information is encoded into a neural network and the neural network is trained using the encoded user information. As an output of the trained neural network, passwords corresponding to the user are generated.

20 Claims, 6 Drawing Sheets

(56) References Cited

U.S. PATENT DOCUMENTS

| | | | |
|---|---|---|---|
| 2007/0220597 A1* | 9/2007 | Ish Ida; Natsuki | G06Q 20/12 |
| | | | 726/8 |
| 2011/0041166 A1 | 2/2011 | Mani | |
| 2015/0281211 A1 | 10/2015 | Josang et al. | |
| 2016/0117494 A1* | 4/2016 | Kaplan | G06F 21/31 |
| | | | 726/18 |
| 2016/0275272 A1* | 9/2016 | Koshinuma | G06F 21/31 |
| 2017/0337364 A1* | 11/2017 | Whaley | G06N 99/005 |

OTHER PUBLICATIONS

"John the Ripper Password Cracker," Openwall, 2013, 3 pages.
Grassi et al, "DRAFT NIST Special Publication 800-63B Digital Identity Guidelines, Authentication and Lifecycle Management," National Institute of Standards and Technology, U.S. Department of Commerce, Mar. 8, 2017, 85 pages.
Veras et al., "On the Semantic Patterns of Passwords and their Security Impact," 2014 Network and Distributed System Security (NDSS) Symposium, San Diego, CA, Feb. 2014, 16 pages.
Weir et al., "Password Cracking Using Probabilistic Context-Free Grammars," 2009 30th IEEE Symposium on Security and Privacy, Oakland, CA, May 2009, 15 pages.

* cited by examiner

DEEP LEARNING FOR TARGETED PASSWORD GENERATION WITH COGNITIVE USER INFORMATION UNDERSTANDING

BACKGROUND OF THE INVENTION

Technical Field

This disclosure relates to password generation.

Description of Related Art

Password generation technology is important in many applications such as password cracking and password metering. In traditional systems, password generation is studied with little regard to user information. However, increasing targeted attacks involving celebrities, key persons of a government, or key persons of a company, increasingly demands understanding of user information. When users encode their personal information into their passwords (e.g., newyork77 where New York is where the user lives, and 1977 is the user's birth year, etc.), especially those of which can be easily mined from social networks or other published articles, they can be relatively easily attacked. Passwords are still weak even if users apply some semantic transformation (e.g., yankees77 when the user lives in New York, etc.).

Traditional password cracking and metering is based on dictionaries, mangling rules, and estimating entropy from character distributions. More advanced models provide user passwords based on probabilistic context free grammars. Using a training set, passwords are decomposed into character classes which have been expanded to using natural language ontologies. Words identified in passwords are assigned to a class in an ontology, and during password generation, any word from that class may be sampled. Further approaches measure the entropy of a password by estimating how long it would take to crack (generate), and is based on several properties, including character co-location on a keyboard.

SUMMARY

An approach is provided that receives a set of user information pertaining to a user. The received set of information is encoded into a neural network and the neural network is trained using the encoded user information. As an output of the trained neural network, passwords corresponding to the user are generated.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
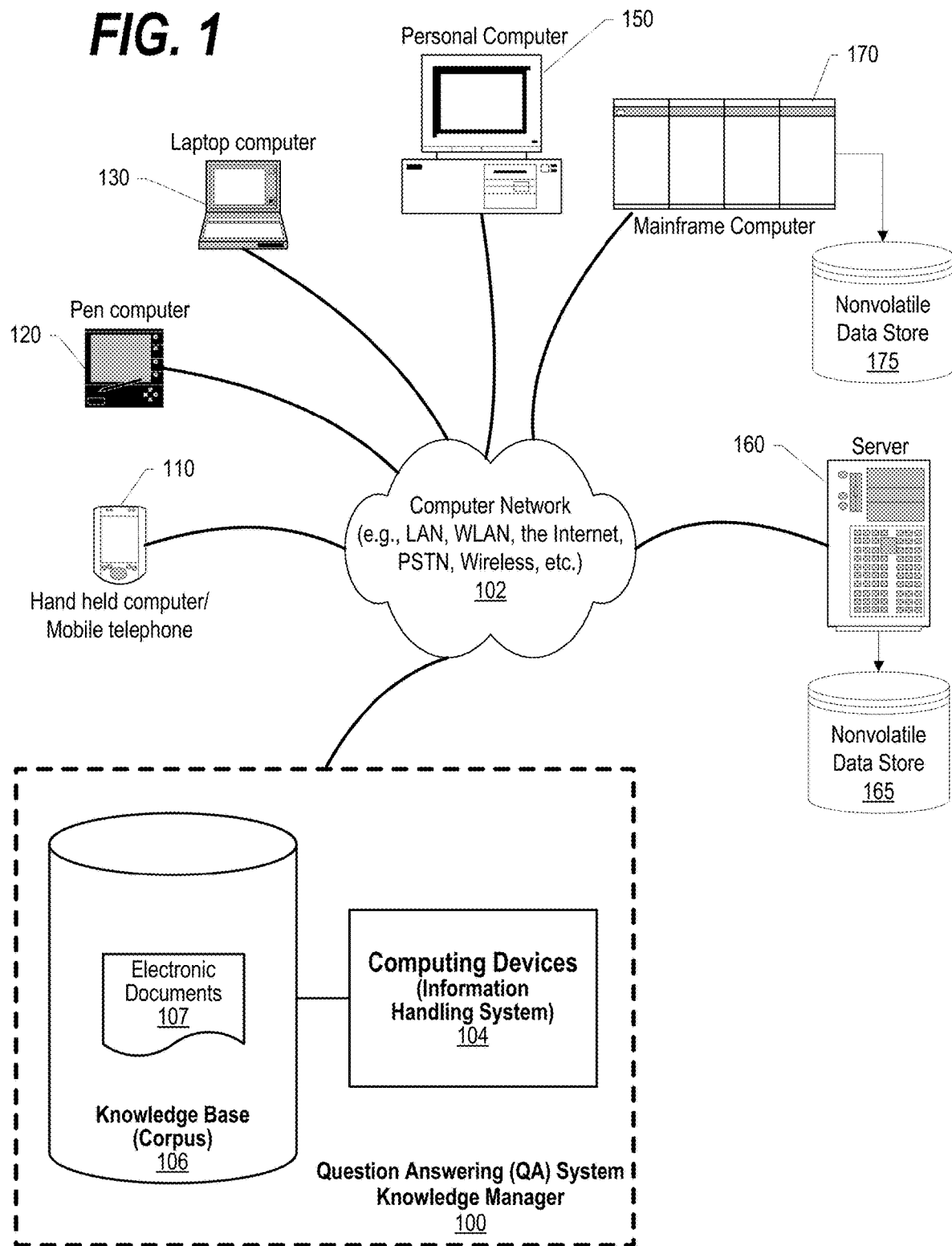
FIG. 1 depicts a network environment that includes a knowledge manager that utilizes a knowledge base.

FIGS. 1-6 describe an approach that leverages a deep learning technique to digest user information, and also generates passwords. An advantage of these models is that the models are capable of transforming user information into parts of passwords which has been neglected, or only studied as an input password dictionary, in traditional approaches. In one embodiment, a sequence-to-sequence (seq2seq) model is utilized that directly translates user information into passwords. In another embodiment, an enhanced seq2seq model is utilized that allows semantic transformation of information. The first model exploits a long short-term memory (LSTM) encoder-decoder known as seq2seq. This model translates an input character sequence of a variable length into a desired output character sequence. The approach can utilized "leaked" personal information and password pairs or those legitimately offered by users as training data for this deep neural network. Leaked personal information might be information found on the Internet, such as in social media platforms, and legitimately offered information can be user information given when a user sign up a service.

While this model can learn that New York can be translated to "jeter," or "yankees" in passwords, the generalization of using such relationships can be difficult (e.g., a baseball player for another state). Thus, the approach utilizes the second model with even more generalization power. This model is similar to the first model, but the second model incorporates the semantic transformation, whose generalization may not be available in the password data. Instead, the approach used in the second model can leverage word representations such as word2vec learned with much larger corpus. In word2vec, the approach infers which words (e.g., Elvis_Andrus) are close to v(Texas)–v(New_York)+v(Jeter), where v(w) indicates the word representation of w, so that we can generalize the relationship of New York and Jeter into State and Baseball players.

The first model is similar to the existing seq2seq model with some important differences. In the first model, the input is tweaked to signal to the network which information will be fed into the neural net. For example, the approach may use a special constant <state> to indicate the start of a feed of the state name into the network. Likewise, the approach may signal again with <email> to indicate the start of a feed of email character sequences. From the various inputs, the deep neural network learns which pieces of user information are useful in generating passwords.

The second model incorporates the semantic transformation in word representations. The approach achieves this goal by adding an optimization criteria so that the hidden state (memory, or the encoded user information) of the encoder conveys semantic meaning of the words in the input character sequence derived from word2vec. In particular, the approach learns a function ("F") that transforms the hidden state to a word representation (e.g., word2vec, etc.) so that the hidden state conveys the semantic meaning of the word representation. The approach optimizes this criteria using the words identified in the user information. The approach then transforms the manipulated hidden state into passwords using the decoder. Such transformations performed using the second model may include semantic transformations such as "a baseball player of the input state" (v(state)−v(New_York)+v(Jeter)), and "the capital of the input country" (cap(country)), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
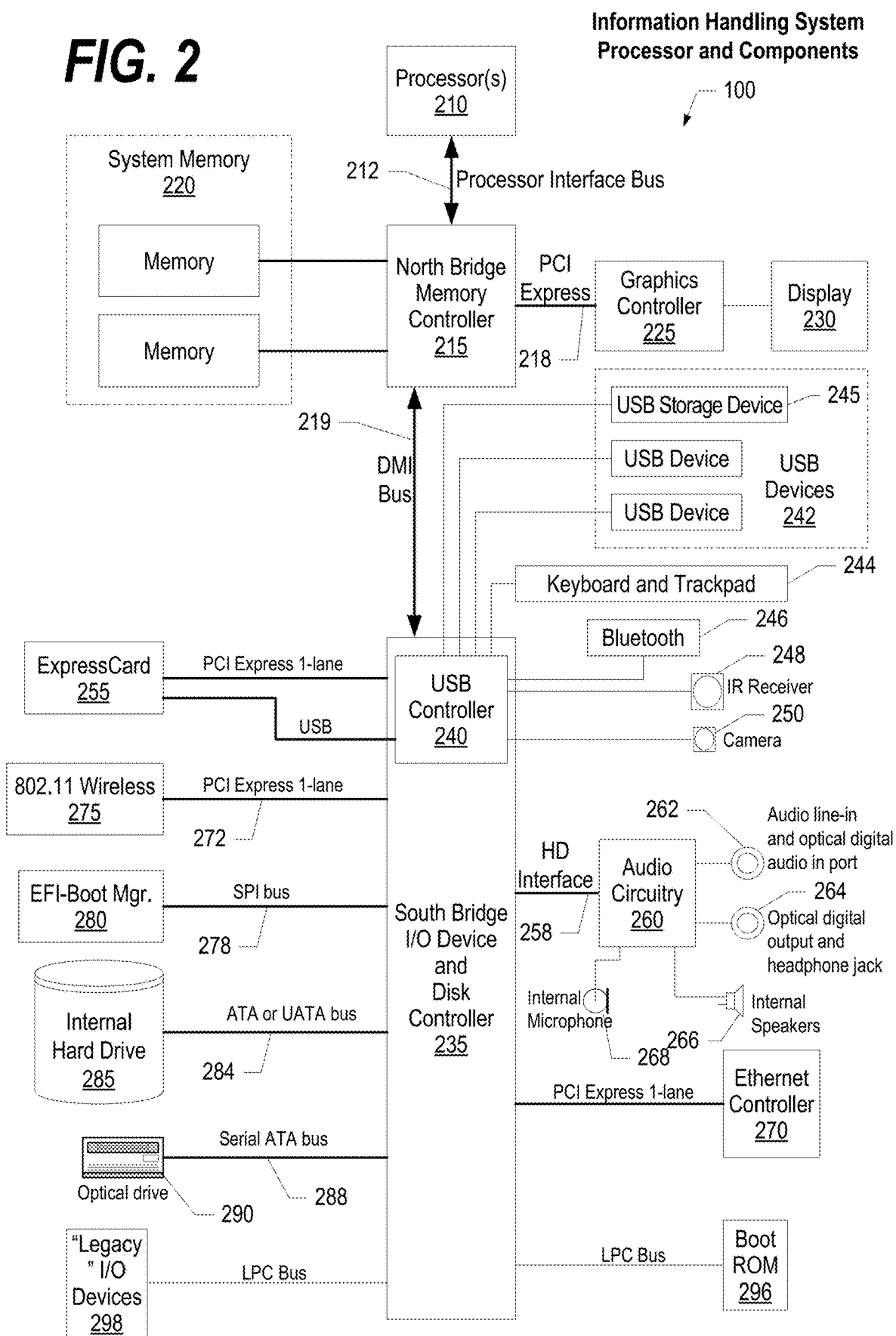
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE. 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
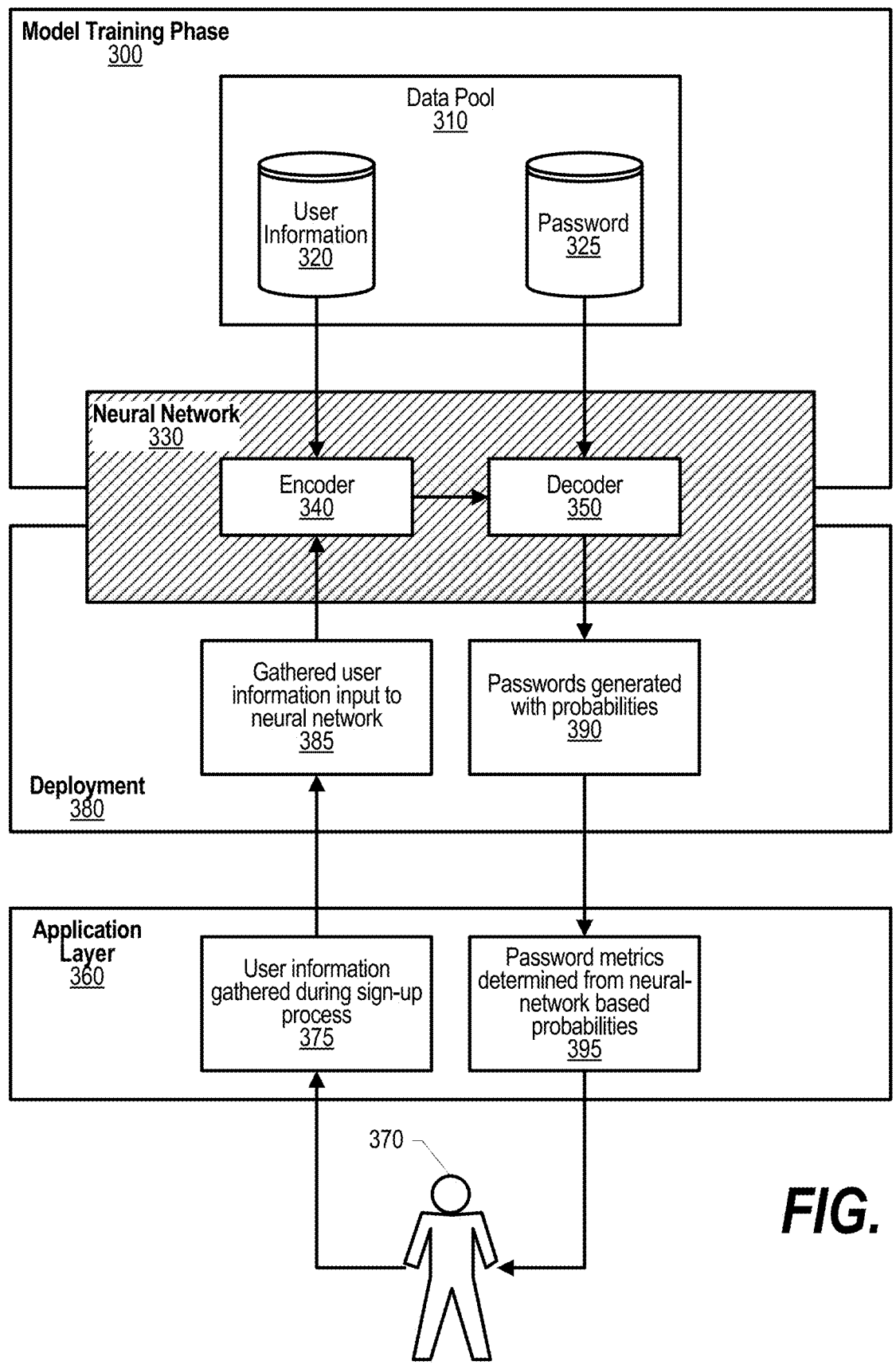
FIG. 3 is a component diagram that shows the various components that interact to provide deep learning for targeted password generation with cognitive user information understanding.

FIG. 3 is a component diagram that shows the various components that interact to provide deep learning for targeted password generation with cognitive user information understanding. Model training phase 300 gathers data pool 310 that includes both user information, shown stored in data store 320, as well as user password shown stored in data store 325. User information and passwords are used to train neural network 330.

Neural network 330 includes encoder 340 that encodes the user information into the neural network. In one embodiment, the encoder parses the user information, tokenizes the user information, and breaks down the user information into single character inputs that are inputted into the neural network as training data. Neural network 330 also includes decoder 350 that decodes the user information that was inputted to the neural network via the encoder. The decoder is used to generate possible passwords for a particular user along with probabilities for such passwords. As shown, decoder 350 also receives the user's actual password as an input to compare to the generated passwords.

Deployment phase 380 continues to gather user information that is input to the neural network (process 385), as well as generates passwords by receiving decoded information from neural network 330. The generated passwords can also include the probabilities corresponding to each of the generated passwords with the probabilities being how likely each of the generated password is the actual password used by the user.

Application layer 360 uses process 375 to input user information that is gathered from user 370 during the sign-up process as well as gathering other information pertaining to the user, such as publicly available information found in the Internet and social media sites. Application layer 360 interfaces with user 370 receiving user information from the user that is input to the neural network and providing the user with password metrics that are determined from the neural network based probabilities (process 395). These password metrics inform the user of the strength of the user's password based on the output of the neural network based on the user's information. The user's information, such as the user's home city, state, country, birth date, and the like, are received both from the user as well as from publicly-accessible data sources, such as social media sites and other resources accessible on the Internet, etc. User's information can also include such items such as the user's high school, college, spouse name, children and pet names, family names, nicknames, country of residence, employer, county of residence, occupation, birthdates of spouse, children, pets, etc.

Figure 4:
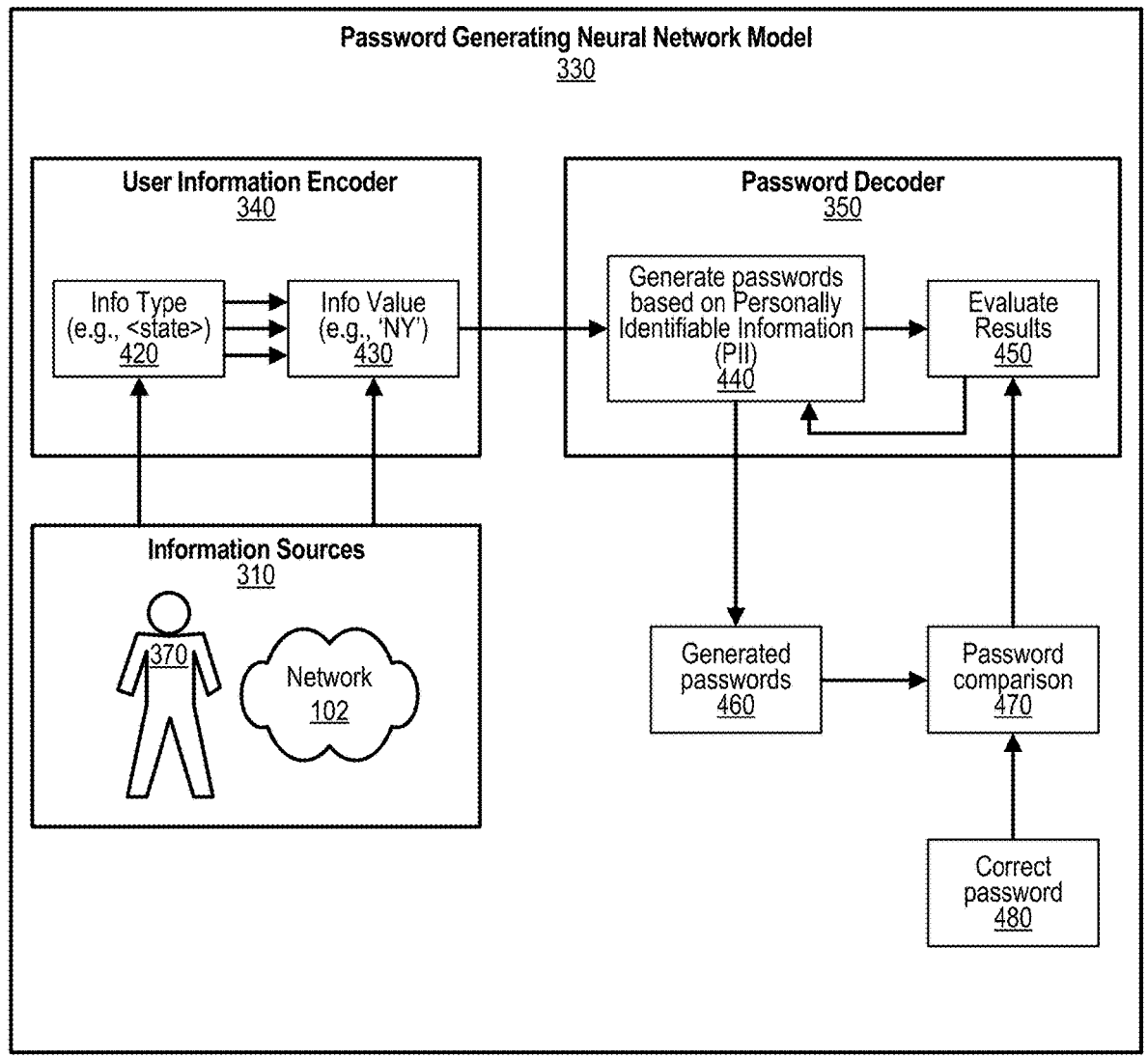
FIG. 4 is a component diagram that shows the interaction between the user information encoder component and the password decoder component to generate targeted passwords.

FIG. 4 is a component diagram that shows the interaction between the user information encoder component and the password decoder component to generate targeted passwords. Password generating neural network model 330 includes user information encoder component 340 and password decoder component 350. Information encoder 340 receives information from information sources 310, such as user 370 that is the corresponding to the password that is being analyzed as well as network resources 102, such as publicly accessible information available pertaining to the user (e.g., social media sites, etc.).

Neural network encoder 340 takes input letter by letter. Besides regular letters and symbols, information type 420 (e.g., "<state>," etc.) can be a special symbol. Note that the encoder maps letters to integers, such as 'a'→1, 'b'→2, etc. In the same way, the approach assigns a number to type type of data, such as "<state>"→30000, etc. The arrows from 310 represent special symbols (e.g., <state>, etc.) or regular letters (e.g., a, . . . , z, 0, . . . , 9, !, @, etc.). Information encoder 340 has a "type" of information 420 as well as a value of the information 430 that corresponds to the type. In the example shown, the type of information being input is the user's state, represented by "<state>" which may be represented numerically, and the value for the user's state is "New York."

Password decoder component 350 of neural network 330 uses process 440 to generate passwords with the passwords being based on the user's personally identifiable information, or "PII." Generated passwords are output to 460 whereupon password comparison process 470 compares the generated passwords to correct password 480. The result of password comparison 470 is evaluated by password decoder 350 process 450. In one embodiment, the results from the password evaluation are input to the neural network as further training input to the network.

Figure 5:
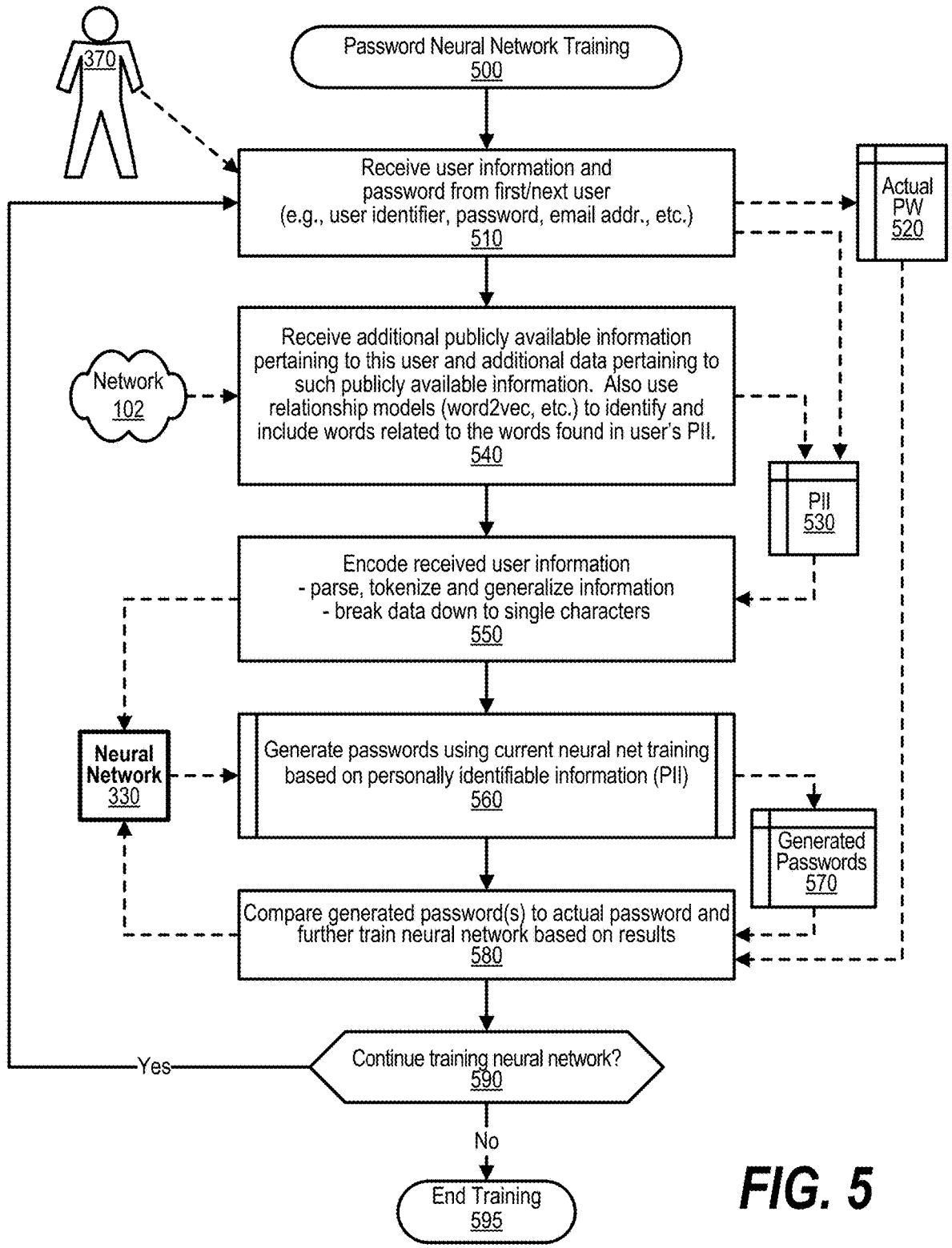
FIG. 5 is a depiction of a flowchart showing the logic used during password neural network training.

FIG. 5 is a depiction of a flowchart showing the logic used during password neural network training. FIG. 5 processing commences at 500 and shows the steps taken by a process that trains a neural network that performs password generation based on user information. At step 510, the neural network training process receives the user's information and the user's password from the first user. The user's information includes a user identifier, the user's password, the user's email address and any other user-supplied information. The user's actual password is stored in memory area 520 for eventual comparison with the passwords generated by the neural network. The user's information is stored as personally identifiable information (PII) in memory area 530. At step 540, the neural network training process receives additional publicly available information pertaining to this user and any additional data pertaining to such publicly available information, such as from social media sites and the like accessed via computer network 102, such as the Internet. In addition, the neural network training process uses relationship models, such as word2vec, etc., to identify and include words that are related to the words found in user's PII. This additional information is also stored as personally identifiable information (PII) in memory area 530. At step 550, the neural network training process encodes the received user information and inputs the information into neural network 330. In one embodiment, the encoding process includes parse the information, tokenizing the information, and generalizing the information. Regarding generalization, in one embodiment the process performs mapping of word embedding. The neural network is trained to encode PII information to follow word embedding so that the neural network leverages generalized relationships in word embedding. This can be viewed as learning a function f(x) that maps encoded PII x to word embedding f(x) to which x corresponds.

The type of data (as previously shown in FIG. 4) is stored along with the information value. The encoding process further breaks the data down into single character inputs that are input into neural network 330. At step 560, the neural network training process generates passwords using the current neural net training model that is based on the personally identifiable information (PII) of the current user. These generated passwords are stored in memory area 570. At step 580, the neural network training process compares the passwords generated by the neural network (retrieved from memory area 570) to the user's actual password (retrieved from memory area 520). In addition, in one embodiment, the process further trains the neural network based on results of the comparison. The neural network training process determines whether to continue training the neural network (decision 590). If training of the neural network continues, then decision 590 branches to the 'yes' branch which loops back to step 510 to receive the next user and the user information and actual password corresponding to the next user. This looping continues until no more neural network training is performed, at which point decision 590 branches to the 'no' branch exiting the loop. Training of the neural network as shown in FIG. 5 thereafter ends at 595.

Figure 6:
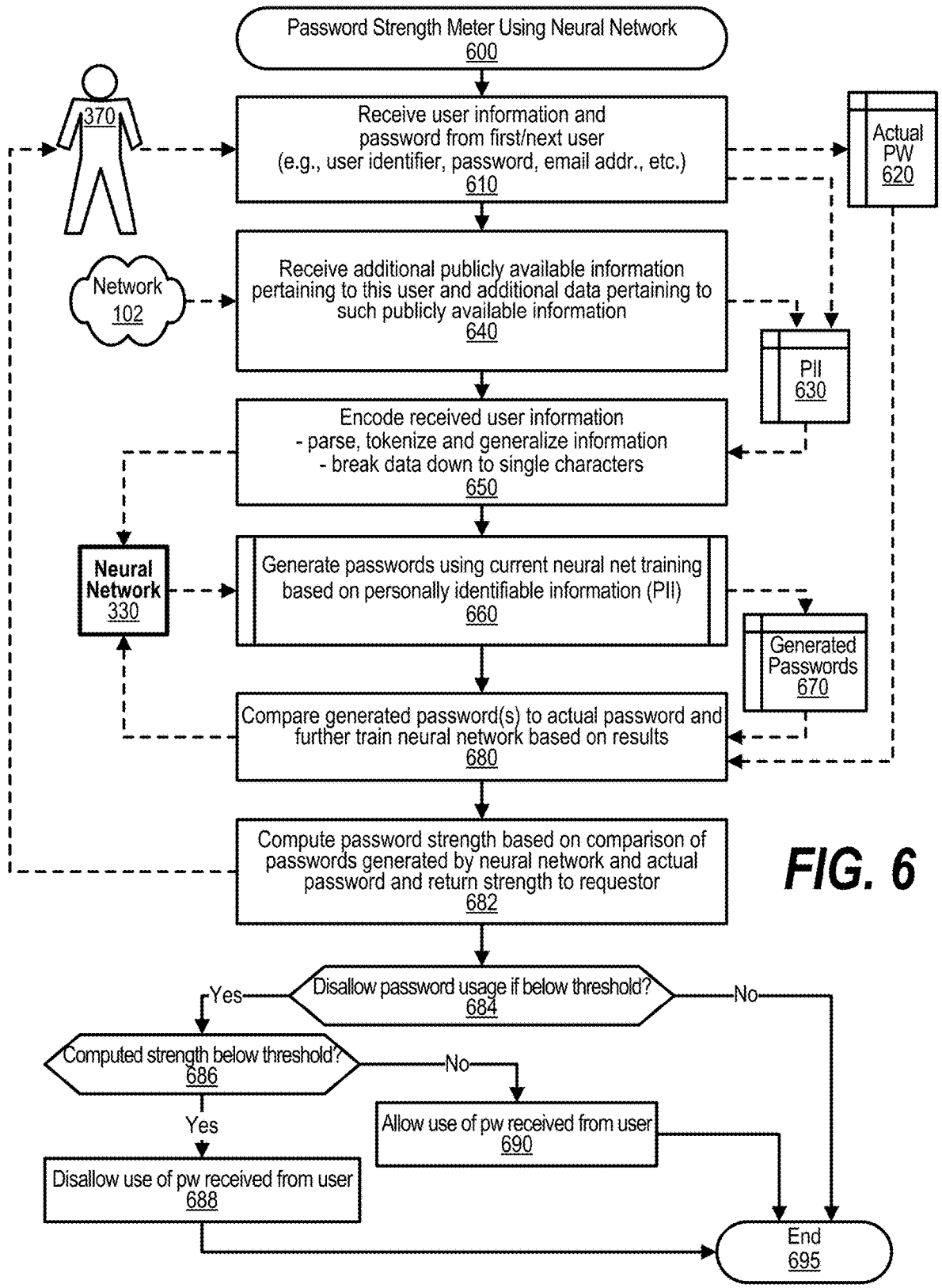
FIG. 6 is a depiction of a flowchart showing the logic used in measuring password strength using the trained neural network.

FIG. 6 is a depiction of a flowchart showing the logic used in measuring password strength using the trained neural network. In one embodiment, the processing shown in FIG. 6 utilizes a neural network trained by the steps shown in FIG. 5. During usage of the neural network, as shown here in FIG. 6, training of the neural network continues at the same time that the neural network is used to compute password strength based on deep learning for targeted password generation with cognitive user information understanding.

FIG. 6 processing commences at 600 and shows the steps taken by a process that trains a neural network that performs password generation based on user information. At step 610, the neural network training process receives the user's information and the user's password from the first user. The user's information includes a user identifier, the user's password, the user's email address and any other user-supplied information. The user's actual password is stored in memory area 620 for eventual comparison with the passwords generated by the neural network. The user's information is stored as personally identifiable information (PII) in memory area 630. At step 640, the neural network training process receives additional publicly available information pertaining to this user and any additional data pertaining to such publicly available information, such as from social media sites and the like accessed via computer network 102, such as the Internet. In addition, the neural network training process uses relationship models, such as word2vec, etc., to identify and include words that are related to the words found in user's PII. This additional information is also stored as personally identifiable information (PII) in memory area 630. At step 650, the neural network training process encodes the received user information and inputs the information into neural network 330. In one embodiment, the encoding process includes parse the information, tokenizing the information, and generalizing the information. The type of data (as previously shown in FIG. 4) is stored along with the information value. The encoding process further breaks the data down into single character inputs that are input into neural network 330. As previously described, in one embodiment, the encoding process includes parse the information, tokenizing the information, and generalizing the information. Regarding generalization, in one embodiment the process performs mapping of word embedding. The neural network is trained to encode PII information to follow word embedding so that the neural network leverages generalized relationships in word embedding. This can be viewed as learning a function f(x) that maps encoded PII x to word embedding f(x) to which x corresponds.

At step 660, the neural network training process generates passwords using the current neural net training model that is based on the personally identifiable information (PII) of the current user. These generated passwords are stored in memory area 670. At step 680, the neural network training process compares the passwords generated by the neural network (retrieved from memory area 670) to the user's actual password (retrieved from memory area 620). In addition, in one embodiment, the process further trains the neural network based on results of the comparison.

Steps 682 through 690 are performed to compute the password strength of the password provided by the user. At step 682, the process computes the strength of the user's actual password based on the comparison of the passwords generated by the neural network and the user's actual password. In one embodiment, this strength value is returned to the requestor, such as user 370 or a process that is performing password analysis on behalf of the user. The process determines whether to disallow usage of the actual password based on whether the calculated password strength score is below a particular threshold (decision 684). If the password strength score is below the threshold, then decision 684 branches to the 'yes' branch whereupon, at step 688, the system does not allow the user to use the password requested because the password is too weak and might be vulnerable to attack. On the other hand, if the password strength score meets the password strength threshold, then decision 684 branches to the 'no' branch whereupon, at step 690, the password requested by the user is allowed. The process determines as to whether computed strength below threshold (decision 686). If computed strength below threshold, then decision 686 branches to the 'yes' branch. On the other hand, if not computed strength below threshold, then decision 686 branches to the 'no' branch. FIG. 6 processing thereafter ends at 695.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   receiving a set of user information pertaining to a user;
   training a neural network using the received set of user information, wherein the neural network includes an encoder and a decoder and wherein the training further includes encoding the received set of user information by parsing the received set of user information and breaking the parsed user information into inputs that are inputted into the neural network;
   generating one or more passwords corresponding to the user, wherein the generating includes decoding the set of user information; and
   further training the neural network using one or more results of a comparison between the generated one or more passwords and an actual password corresponding to the user.

2. The method of claim 1 further comprising:
   receiving the actual password corresponding to the user; and
   comparing the one or more generated passwords to the actual password.

3. The method of claim 2 further comprising:
   informing the user of a low password strength in response to one of the generated passwords matching the actual password.

4. The method of claim 2 further comprising:
   further training the neural network based on the actual password.

5. The method of claim 2 further comprising:
   computing a password strength based on the comparison.

6. The method of claim 5 further comprising:
   disallowing a usage of the actual password in response to the computed password strength being below a password strength threshold.

7. The method of claim 1 wherein the encoding further comprises:
   generalizing the received set of user information; and wherein breaking the parsed user information into inputs comprises breaking the parsed user information into single character inputs that are inputted into the neural network.

8. An information handling system comprising:
one or more processors;
a memory coupled to at least one of the processors; and
a set of computer program instructions stored in the memory and executed by at least one of the processors in order to perform actions comprising:
  receiving a set of user information pertaining to a user;
  training a neural network using the received set of user information, wherein the neural network includes an encoder and a decoder and wherein the training further includes encoding the received set of user information by parsing the received set of user information and breaking the parsed user information into inputs that are inputted into the neural network;
  generating one or more passwords corresponding to the user, wherein the generating includes decoding the set of user information; and
  further training the neural network using one or more results of a comparison between the generated one or more passwords and an actual password corresponding to the user.

9. The information handling system of claim 8 wherein the actions further comprise:
  receiving the actual password corresponding to the user; and
  comparing the one or more generated passwords to the actual password.

10. The information handling system of claim 9 wherein the actions further comprise:
  informing the user of a low password strength in response to one of the generated passwords matching the actual password.

11. The information handling system of claim 9 wherein the actions further comprise:
  further training the neural network based on the actual password.

12. The information handling system of claim 9 wherein the actions further comprise:
  computing a password strength based on the comparison.

13. The information handling system of claim 12 wherein the actions further comprise:
  disallowing a usage of the actual password in response to the computed password strength being below a password strength threshold.

14. The information handling system of claim 8 wherein the encoding further comprises:
  generalizing the received set of user information; and
  wherein breaking the parsed user information into inputs comprises breaking the parsed user information into single character inputs that are inputted into the neural network.

15. A computer program product stored in a computer readable storage medium, comprising computer program code that, when executed by an information handling system, performs actions comprising:
  receiving a set of user information pertaining to a user;
  training a neural network using the received set of user information, wherein the neural network includes an encoder and a decoder and wherein the training further includes encoding the received set of user information by parsing the received set of user information and breaking the parsed user information into inputs that are inputted into the neural network;
  generating one or more passwords corresponding to the user, wherein the generating includes decoding the set of user information; and
  further training the neural network using one or more results of a comparison between the generated one or more passwords and an actual password corresponding to the user.

16. The computer program product of claim 15 wherein the actions further comprise:
  receiving the actual password corresponding to the user; and
  comparing the one or more generated passwords to the actual password.

17. The computer program product of claim 16 wherein the actions further comprise:
  informing the user of a low password strength in response to one of the generated passwords matching the actual password.

18. The computer program product of claim 16 wherein the actions further comprise:
  further training the neural network based on the actual password.

19. The computer program product of claim 16 wherein the actions further comprise:
  computing a password strength based on the comparison; and
  disallowing a usage of the actual password in response to the computed password strength being below a password strength threshold.

20. The computer program product of claim 15 wherein the encoding further comprises:
  generalizing the received set of user information; and
  wherein breaking the parsed user information into inputs comprises breaking the parsed user information into single character inputs that are inputted into the neural network.

* * * * *